May 5, 1936.  A. W. JOHANSON  2,039,718
CALIPER GAUGE
Filed Oct. 7, 1935
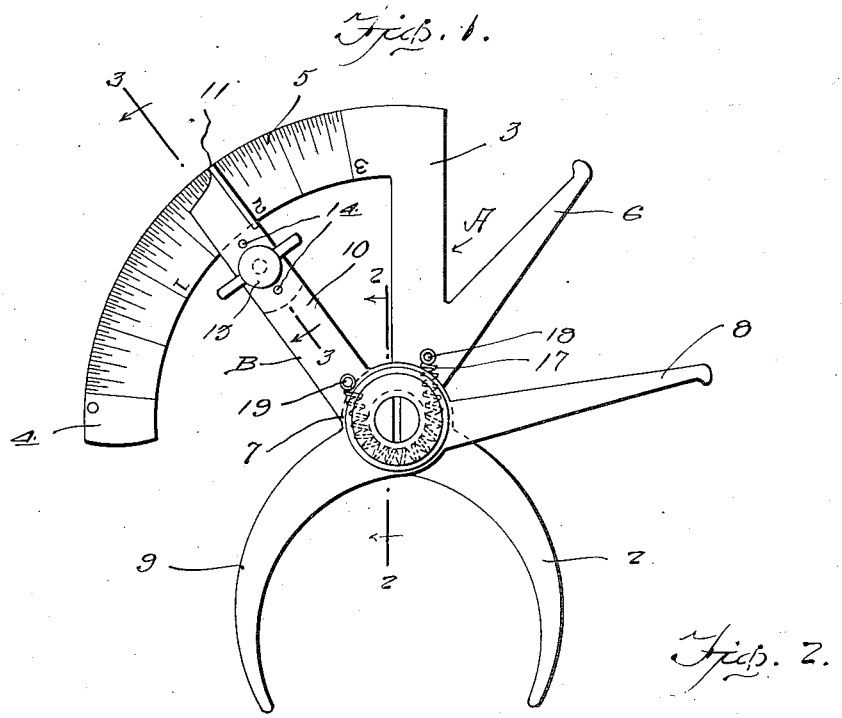
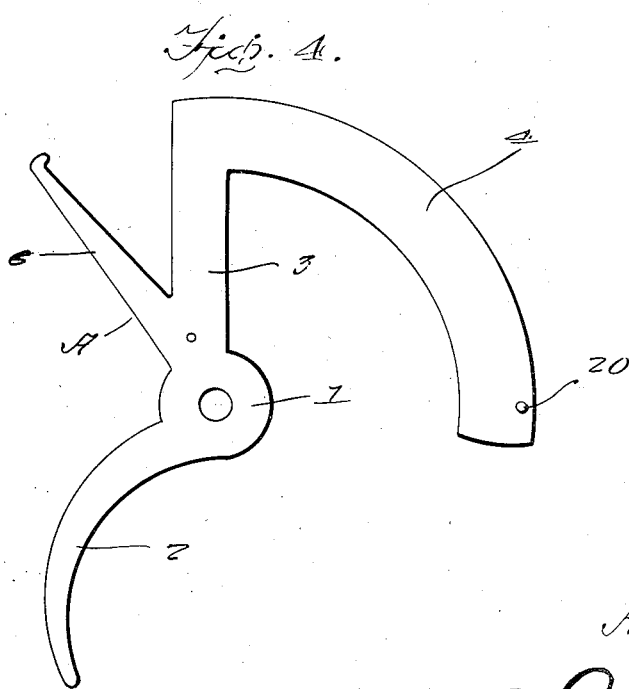
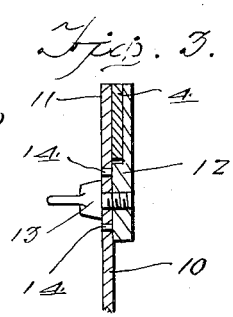
Inventor
A. W. Johanson
By Clarence A. O'Brien
Attorney Patented May 5, 1936

2,039,718

UNITED STATES PATENT OFFICE 2,039,718

CALIPER GAUGE

Anton W. Johanson, Florence, Ala.

Application October 7, 1935, Serial No. 43,943

1 Claim. (Cl. 33—148)

This invention relates to calipers, the general object of the invention being to provide a device of this nature which can be used for taking inside and outside measurements, with a gauge for indicating the measurements, a spring for returning the parts to closed position and clamping means for holding the parts in adjusted position.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a view of the front face of the improved device.

Figure 2 is a section on the line 2—2 of Figure 1.

Figure 3 is a section on the line 3—3 of Figure 1.

Figure 4 is a rear view of that part of the device which carries the arcuate gauge plate.

In this drawing the letter A indicates one part of the device which is formed with the hub 1, the curved arm 2 forming one limb of the outside measurements caliper, the straight arm 3 which carries the arcuate plate 4 having the graduations 5 on its front face and said straight arm 3 also has attached thereto the arm 6 which forms one limb for the inside measurement caliper.

The other member or part B includes the hub 7 the inside caliper arm 8 and the outside caliper arm 9, it being understood that the arm 8 cooperates with the arm 6 in member A and the arm 9 cooperates with the arm 2 in member A.

The member B also includes an indicator arm 10 and has its free end forming a pointer 11 for cooperating with the scale 5 and said free end of the arm 10 has a clamping plate 12 attached thereto by the screw 13 and the pin 14, as shown in Figure 3 so that by tightening the screw the plate 4 will be clamped between the free end of the arm 10 and the plate 12, and thus the parts will be held in adjusted position and the pointer 11 will indicate on the scale the amount of movement of the caliper arms.

The two headed members 15 and the screw 16 will rotatably hold the hubs 1 and 7 together and a spring 17 is located in a groove in the front member 15 and has one end connected to a pin 18 on the member A and its other end to a pin 19 on the member B, said spring tending to hold the members in closed position with the extremities of the arms 2 and 9 abutting and the pointer 11 at the zero position on the scale, a stop pin 20 being provided on the free end of the plate 4 for engagement by the plate 12 for preventing the parts from being moved beyond zero position.

Thus it will be seen that I have provided a simple inexpensive device for securing both inside and outside measurements, means for indicating the measurements and means for normally holding the parts in closed position, and clamping means for holding the parts in adjusted position.

It is thought from the foregoing description that the advantages and novel features of the invention will be readily apparent.

It is to be understood that changes may be made in the construction and in the combination and arrangement of the several parts provided that such changes fall within the scope of the appended claim.

What is claimed is:—

Calipers of the class described comprising a pair of members each including a hub, an outside caliper arm, an inside caliper arm, an arcuate scale plate carried by one member, a pointer arm carried by the other member, means for pivotally connecting together the hubs of the two members, a coiled spring for holding the caliper arms in closed position and clamping means carried by the pointer arm and engaging the scale plate for clamping the parts in adjusted position, said pivotal means consisting of a pair of head members, a screw disposed through one of the head members and threaded into the other, said screw being disposed through said caliper members, one of said head members being provided with a reduced portion at its inner side defining a groove between itself and the adjacent caliper member for receiving the intermediate portion of said coiled spring.

ANTON W. JOHANSON.